United States Patent
Damodharan et al.

(10) Patent No.: US 10,786,959 B2
(45) Date of Patent: Sep. 29, 2020

(54) MOLD FOR CONTACT LENS WITH NON-ROTATIONALLY SYMMETRIC RIM OR EDGE

(71) Applicant: Johnson & Johnson Vision Care, Inc., Jacksonville, FL (US)

(72) Inventors: Radhakrishnan Damodharan, Jacksonville, FL (US); Philippe Jubin, Fernandina Beach, FL (US); Matias Heinrich, Neptune Beach, FL (US)

(73) Assignee: Johnson & Johnson Vision Care, Inc, Jacksonville, FL (US)

( * ) Notice: Subject to any disclaimer, the term of this patent is extended or adjusted under 35 U.S.C. 154(b) by 456 days.

(21) Appl. No.: 15/212,542

(22) Filed: Jul. 18, 2016

(65) Prior Publication Data

US 2018/0015678 A1 Jan. 18, 2018

(51) Int. Cl.
*B29D 11/00* (2006.01)
*G02C 7/04* (2006.01)

(52) U.S. Cl.
CPC .... *B29D 11/0048* (2013.01); *B29D 11/00038* (2013.01); *B29D 11/00048* (2013.01); *B29D 11/00057* (2013.01); *B29D 11/00836* (2013.01); *G02C 7/048* (2013.01)

(58) Field of Classification Search
CPC .......... B29D 11/0048; B29D 11/00038; B29D 11/00057; B29D 11/00836; G02C 7/048
USPC ........................................................ 249/117
See application file for complete search history.

(56) References Cited

U.S. PATENT DOCUMENTS

| | | | | |
|---|---|---|---|---|
| 3,212,097 A | * | 10/1965 | Adler | G02C 7/04 351/159.04 |
| 4,193,672 A | * | 3/1980 | Trombley | G02C 7/04 351/159.1 |
| 4,239,353 A | * | 12/1980 | Koller | G02C 7/04 351/159.02 |
| 4,407,766 A | * | 10/1983 | Haardt | B29D 11/00019 249/117 |
| 4,549,794 A | | 10/1985 | Loshaek et al. | |
| 4,614,413 A | | 9/1986 | Obssuth | |
| 4,618,227 A | * | 10/1986 | Bayshore | G02C 7/048 351/159.41 |
| 4,618,229 A | | 10/1986 | Jacobstein et al. | |
| 4,820,038 A | * | 4/1989 | Seger | G02C 7/04 351/159.33 |

(Continued)

FOREIGN PATENT DOCUMENTS

AU 2012307066 9/2017
EP 2645157 A2 10/2013

OTHER PUBLICATIONS

Singapore Search Report from corresponding SG Application No. 10201704900U dated Dec. 11, 2017.

*Primary Examiner* — Xiao S Zhao
*Assistant Examiner* — Emmanuel S Luk

(57) ABSTRACT

A mold for a front curve of an ophthalmic lens includes an inner region having a non-rotationally symmetric shape, an outer region having a rotationally symmetric shape, and a continuous middle region between the inner region and the outer region. A first portion of the middle region is in contact with the inner region, defining a non-rotationally symmetric rim or edge of a front surface of the ophthalmic lens. A second portion of the middle region is in contact with the outer region and is rotationally symmetrical.

1 Claim, 10 Drawing Sheets

(56) References Cited

U.S. PATENT DOCUMENTS

| | | | | |
|---|---|---|---|---|
| 4,890,911 A * | 1/1990 | Sulc | | C08J 7/12 351/159.33 |
| 5,271,875 A * | 12/1993 | Appleton | | B29C 33/0038 249/160 |
| 5,528,321 A | 6/1996 | Blum | | |
| 5,570,142 A * | 10/1996 | Lieberman | | G02C 7/04 351/159.02 |
| 5,635,998 A * | 6/1997 | Baugh | | G02C 7/043 351/159.41 |
| 5,835,187 A * | 11/1998 | Martin | | G02C 7/042 351/159.21 |
| 5,928,682 A * | 7/1999 | Janca | | B29D 11/00125 264/328.9 |
| 5,968,422 A | 10/1999 | Kennedy | | |
| 6,092,899 A * | 7/2000 | Wanders | | G02C 7/043 351/159.48 |
| 6,142,625 A * | 11/2000 | Sawano | | G02C 7/042 351/159.07 |
| 6,206,520 B1 * | 3/2001 | Jubin | | G02C 7/04 351/159.02 |
| 6,779,888 B2 * | 8/2004 | Marmo | | G02C 7/04 351/159.04 |
| 6,871,953 B1 * | 3/2005 | Mandell | | G02C 7/042 351/159.41 |
| 6,886,936 B2 * | 5/2005 | Marmo | | G02C 7/04 351/159.04 |
| 7,052,132 B2 | 5/2006 | Ezekiel | | |
| 7,430,930 B2 | 10/2008 | Zeller et al. | | |
| 7,543,935 B2 | 6/2009 | Ezekiel | | |
| 7,695,135 B1 * | 4/2010 | Rosenthal | | G02C 7/04 351/159.02 |
| 7,699,465 B2 * | 4/2010 | Dootjes | | G02C 7/04 351/159.73 |
| 7,878,650 B2 * | 2/2011 | Fritsch | | G02C 7/04 351/159.02 |
| 9,298,019 B2 * | 3/2016 | Pugh | | G02C 7/04 |
| 9,417,464 B2 * | 8/2016 | Wildsmith | | B29D 11/00028 |
| 9,778,487 B2 * | 10/2017 | Gerligand | | G02C 7/048 |
| 9,880,399 B2 * | 1/2018 | Gerligand | | G02C 7/028 |
| 9,925,038 B2 * | 3/2018 | Yoon | | G02C 7/047 |
| 10,025,114 B2 * | 7/2018 | Riall | | G02C 7/047 |
| 2002/0021410 A1 * | 2/2002 | Ye | | G02C 7/043 351/159.41 |
| 2002/0024631 A1 * | 2/2002 | Roffman | | G02C 7/04 351/159.1 |
| 2002/0149742 A1 * | 10/2002 | Back | | G02C 7/04 351/159.02 |
| 2003/0095231 A1 * | 5/2003 | Ezekiel | | G02C 7/043 351/159.47 |
| 2004/0075807 A1 * | 4/2004 | Ho | | B29D 11/00432 351/159.02 |
| 2004/0150789 A1 * | 8/2004 | Jones | | G02C 7/041 351/159.41 |
| 2004/0156013 A1 * | 8/2004 | Lindacher | | A61F 2/1613 351/159.41 |
| 2004/0233382 A1 * | 11/2004 | Lindacher | | G02C 7/043 351/159.1 |
| 2004/0257526 A1 * | 12/2004 | Lindacher | | G02C 7/043 351/159.1 |
| 2004/0263776 A1 * | 12/2004 | Ezekiel | | G02C 7/043 351/159.41 |
| 2005/0062933 A1 * | 3/2005 | Perel | | G02C 7/042 351/159.41 |
| 2005/0068489 A1 * | 3/2005 | Hall | | G02C 7/043 351/159.1 |
| 2005/0259220 A1 * | 11/2005 | Neadle | | G02C 7/04 351/159.14 |
| 2006/0145371 A1 | 7/2006 | Lawton et al. | | |
| 2007/0146628 A1 * | 6/2007 | Green | | G02C 7/04 351/159.02 |
| 2008/0013044 A1 * | 1/2008 | Wanders | | G02C 7/041 351/159.08 |
| 2008/0097600 A1 * | 4/2008 | Hare | | G02C 7/041 623/6.37 |
| 2008/0102151 A1 * | 5/2008 | Perez | | B29C 33/303 425/408 |
| 2009/0059166 A1 * | 3/2009 | Suzuki | | B23K 26/18 351/159.73 |
| 2009/0141235 A1 * | 6/2009 | Collins | | G02C 7/04 351/159.79 |
| 2009/0166507 A1 * | 7/2009 | Lawton | | B29C 33/20 249/117 |
| 2009/0213459 A1 * | 8/2009 | Amirparviz | | G02B 27/26 359/465 |
| 2009/0225273 A1 * | 9/2009 | Clutterbuck | | G02C 7/04 351/159.02 |
| 2009/0303465 A1 * | 12/2009 | Clements | | G01M 11/0278 356/124 |
| 2010/0201941 A1 | 8/2010 | Gupta | | |
| 2010/0255140 A1 * | 10/2010 | Shimizu | | B29C 39/006 425/434 |
| 2010/0296050 A1 * | 11/2010 | Goto | | G02C 7/021 351/159.06 |
| 2011/0149231 A1 * | 6/2011 | Gerligand | | G02C 7/028 351/159.02 |
| 2012/0075580 A1 * | 3/2012 | Roffman | | G02C 7/041 351/159.41 |
| 2012/0075581 A1 * | 3/2012 | Roffman | | G02C 7/043 351/159.41 |
| 2012/0194778 A1 * | 8/2012 | Skudder | | G02C 7/048 351/159.21 |
| 2012/0206692 A1 * | 8/2012 | Yamaguchi | | G02C 7/048 351/159.05 |
| 2012/0307200 A1 * | 12/2012 | Stupplebeen | | G02C 7/048 351/159.14 |
| 2013/0077045 A1 * | 3/2013 | Gerligand | | G02C 7/048 351/159.74 |
| 2014/0063444 A1 * | 3/2014 | Wildsmith | | B29D 11/00028 351/159.1 |
| 2014/0118683 A1 * | 5/2014 | Jubin | | G02C 7/048 351/159.04 |
| 2015/0248019 A1 * | 9/2015 | Caldarise | | G02C 7/046 351/159.02 |
| 2015/0351901 A1 * | 12/2015 | Stoy | | A61F 2/1613 623/6.34 |
| 2015/0362746 A1 * | 12/2015 | Skudder | | G02C 7/022 351/159.22 |
| 2015/0370090 A1 * | 12/2015 | Ehrmann | | G02C 7/048 351/159.36 |
| 2016/0077244 A1 * | 3/2016 | Saito | | G02B 3/08 362/311.06 |
| 2016/0103336 A1 * | 4/2016 | Nakamura | | G02C 7/04 351/159.36 |
| 2016/0363782 A1 * | 12/2016 | Jubin | | G02C 7/048 |
| 2017/0059882 A1 * | 3/2017 | Gerligand | | G02C 7/028 |
| 2017/0082868 A1 * | 3/2017 | Bailey | | G02C 7/043 |
| 2017/0139231 A1 * | 5/2017 | Gerligand | | G02C 7/028 |
| 2018/0031863 A1 * | 2/2018 | Ochrombel | | B29D 11/00057 |
| 2018/0203251 A1 * | 7/2018 | Goto | | G02C 7/048 |

* cited by examiner

Circular, Continuous, Non Planar

Non Circular, Continuous, Non Planar

Non Circular, Non Continuous, Non Planer

AB & AD

Non Circular, Continuous, Planar

MOLD FOR CONTACT LENS WITH NON-ROTATIONALLY SYMMETRIC RIM OR EDGE

BACKGROUND OF THE INVENTION

Field of the Invention

The present invention relates to a mold for a front curve of an ophthalmic lens that enables manufacture of a lens with a non-rotationally symmetric rim or edge, for example, using a soft-molded process.

Discussion of the Related Art

Myopia or nearsightedness is an optical or refractive defect of the eye wherein rays of light from an image focus to a point before they reach the retina. Myopia generally occurs because the eyeball or globe is too long or the cornea is too steep. A minus or negative powered spherical lens may be utilized to correct myopia. Hyperopia or farsightedness is an optical or refractive defect of the eye wherein rays of light from an image focus to a point after they reach or behind the retina. Hyperopia generally occurs because the eyeball or globe is too short or the cornea is too flat. A plus or positive powered spherical lens may be utilized to correct hyperopia. Astigmatism is an optical or refractive defect in which an individual's vision is blurred due to the inability of the eye to focus a point object into a focused image on the retina. Astigmatism is caused by a non-rotationally symmetric curvature of the cornea. A normal cornea is spherical whereas in an individual with astigmatism, the cornea is not spherical. In other words, the cornea is actually more curved or steeper in one direction than another, thereby causing an image to be stretched out into two line foci rather than focused to a single point. A cylindrical lens rather than a spherical lens may be utilized to resolve astigmatism. Contact lenses may be utilized to correct myopia, hyperopia, astigmatism as well as other visual acuity defects.

Corneal astigmatism may be corrected using a hard or rigid gas permeable contact lens. In this case, a fluid or tear film may exist between the posterior surface of the rigid contact lens and the cornea. This fluid or tear film follows or assumes the shape of the back surface of the contact lens. Since the index of refraction of the fluid or tear film is nearly a match for the cornea, the corneal toricity is optically neutralized or reduced. In these cases, a toric lens will not be required. However, rigid gas permeable contact lenses and hard contact lenses are generally less comfortable than soft or hydrogel contact lenses. Since soft or hydrogel contact lenses wrap around the cornea, a fluid film is generally not found and the tear fluid more closely resembles a thin film. In this case, a toric lens design may be required.

A toric lens is an optical element having two different powers in two orientations that are perpendicular to one another. Essentially, a toric lens has one power (spherical) for correcting myopia or hyperopia and one power (cylinder) for correcting astigmatism built into a single lens. These powers are created with curvatures oriented at different angles which are preferably maintained relative to the eye. Toric lenses may be utilized in eyeglasses, intraocular lenses and contact lenses. The toric lenses used in eyeglasses and intraocular lenses are held fixed relative to the eye by either the spectacle frame or haptics, thereby always providing optimal vision correction. However, toric contact lenses without stabilization features may tend to rotate on the eye, thereby temporarily providing sub-optimal vision correction. Accordingly, currently utilized toric contact lenses also include a mechanism to keep the contact lens relatively stable on the eye when the wearer blinks or looks around. For many high order aberrations, many of which are not rotationally symmetric, positional stability and centration are also required to provide optimal vision correction.

It is known that correction of certain optical defects may be accomplished by imparting non-rotationally symmetric corrective characteristics to one or more surfaces of a contact lens such as cylindrical, bifocal, multifocal, wavefront corrective characteristics or decentration of the optical zone. It is also known that certain cosmetic features such as print patterns, markings, and the like are required to be placed in a specific orientation relative to the wearer's eye. Thus each of the non-rotationally symmetric contact lenses of a pair must be maintained at a specific orientation while on the eye to be effective. When a contact lens is first placed on-eye, it must automatically position, or auto-position, itself and then maintain that position over time. However, once the contact lens is positioned, it tends to rotate on the eye due to the force exerted on the contact lens by the eyelids during blinking as well as eyelid and tear film movement.

Maintenance of the on-eye orientation of a contact lens typically is accomplished by altering the mechanical characteristics of the contact lens. For example, prism stabilization, including decentering of a contact lens front surface relative to the back surface, thickening of the inferior contact lens periphery, forming depressions or elevations on a contact lens surface, and truncating the contact lens edge, are all methods that are utilized.

Additionally, static stabilization has been used in which the contact lens is stabilized by the use of thick and thin zones, or areas in which the thickness of a contact lens periphery is increased or reduced. Typically, the thick and thin zones are located in the contact lens periphery with symmetry about the vertical and/or horizontal axes. For example, each of two thick zones may be positioned on either side of the optic zone and centered along the 0-180 degree axis of the contact lens. In another example, a single thick zone positioned at the bottom of the contact lens providing a similar weight effect, like that of prism stabilization, but also incorporating a region of increasing thickness from top to bottom in order to utilize upper eyelid forces to stabilize the contact lens may be designed. It is important to note that older technical literature utilizes the term dynamic stabilization for what we mean here as static stabilization. Accordingly, for purposes of this invention, static and dynamic stabilization are utilized interchangeably.

The challenge with current stabilization zones is a tradeoff between contact lens stability and comfort, plus the physical limitations associated with increased thickness. With a static or dynamic stabilization zone, the slope of the stabilization zone is fixed in the contact lens. Changes to the design to improve rotational speed, such as increasing the surface slope of the stabilization zone, also increases contact lens thickness and may adversely impact comfort. Additionally, contact lens design has to accomplish two things: (1) to rotate to the proper orientation on insertion and (2) to maintain that orientation through the wear period. Conventional designs require tradeoffs in performance between these two modes.

In a newborn, the crystalline lens of the eye is somewhat soft and pliant making it extremely flexible and capable of a large degree of accommodation or focusing. As a person ages, the crystalline lens gradually becomes more rigid, and thus, their eyes are less able to accommodate, or bend the natural lens, to focus on objects that are relatively near to the observer. This condition is known as presbyopia.

A plus power lens may be utilized to restore the focusing power lost by the crystalline lens. The plus power lens may take the form of reading glasses, bifocal glasses or trifocal glasses. Reading glasses are easily utilized when an individual does not need refractive correction for distance. However, distant objects will be blurry when looking through reading glasses. If an individual is already wearing glasses for myopia, hyperopia and/or astigmatism, then the plus power may be added to the existing glasses in the form of a bifocal or trifocal lens. Contact lenses may also be worn to address presbyopia. In one type of such lenses, distance and near vision regions are concentrically arranged around the geometric center of the lens. Light passing though the optical zone of the lens is concentrated and focused at more than one point in the eye. These lenses are generally used in simultaneous vision mode. In simultaneous vision, portions of the lens optical zone focused for distance and near are available at the same time, focusing light from both object distances simultaneously. This is disadvantageous as image quality and image contrast may be degraded.

In a segmented lens, near and distance vision regions are not concentric about the geometric center of the lens. The wearer of segmented lenses is able to access the near vision region of the lens because the lens is constructed to allow it to translate, or move vertically relative to the pupil of the wearer's eye. This translating lens moves vertically when the person wearing the lens shifts their gaze downwardly, for example, to read. This upwardly positions the near vision portion in the center of the wearer's gaze. Substantially all of the light passing though the optical zone may be focused at a single point in the eye based on gaze.

One type of translating lens has a truncated shape. That is, unlike most lenses that are substantially continuously circular or oval, the lower portion of the truncated contact lens is flattened by cutting off or shortening that part of the lens. This results in a substantially flat, thick edge at the bottom of the lens. Exemplary descriptions of such lenses are set forth in a number of patents, including U.S. Pat. Nos. 7,543,935, 7,430,930, 7,052,132, and 4,549,794. However, such a relatively flat edge may tend to reduce comfort. It is therefore desirable to have a translating contact lens without this type of edge design, thereby providing improved comfort.

Contact lenses for presbyopia, astigmatism and other optical defects generally require non-optical features as described herein for positioning and maintaining the rotational orientation of the lens on eye. These features require certain tradeoffs, for example, comfort and fit for visual acuity. Accordingly, there exists a need for contact lenses with improved on-eye performance while maintaining a high degree of comfort.

An improved fit contact lens would preferably provide improved centration, improved rotation and/or translation of the contact lens on-eye and improved tear exchange. By modifying the rim or edge design of a contact lens, on-eye orientation, for example, with toric lenses, may be maintained without the need for stabilization zones or similar constructs. By modifying the rim or edge design of a contact lens, presbyopia may be addressed without the need for complicated, general fit translating contact lenses. By modifying the rim or edge design of a contact lens, differential pressure in the post-lens tear film may be obtained, thus improving tear exchange without the need to significantly modify the contact lens, thereby promoting improved clinical comfort. The rim shape may be optimized based on ocular anatomy, including eyelid geometry, eyelid tension, blink movement characteristics, and corneal/trans-limbal topography.

FIG. 1 shows a known mold 100 for the front curve of a contact lens having an inner region 105, and outer region 110, and a boundary region 115 between regions 105 and 110. The inner region 105 is concave and corresponds to the shape of the front surface of the contact lens. The outer region 110 may be flat, such as a disk, and is part of the mold, but does not form any part of the front surface of the contact lens. The outer region may have a surface feature, such as a rib or protrusion, to enable manufacturing. The boundary region 115 determines the shape of the contact lens rim or edge. In FIG. 1, the lens edge will be circular and flat, which means that the intersection between inner region 105 and outer region 110 is circular and every point along boundary region 115 lies in a single plane. Four cross-sections are illustrated (AB, AC, AD, and AE). These four cross-sections have an identical shape because the mold is rotationally symmetric with respect to an axis of symmetry passing through point A. The front surface of the contact lens resulting from this mold has a circular, rotationally-symmetric edge.

A lens having a non-rotationally symmetric rim or edge presents multiple challenges that are non-existent in a traditional lens mold. The fact that the rim or edge path is non-rotationally symmetric requires the lens mold to have customized features to achieve complete edge contact (and cut-off) between the front and back curves, while maintaining current manufacturing processes. This is particularly important in a very high volume manufacturing process such as fabrication of contact lenses.

Accordingly, there is a need for lens molds that can produce lenses having a rim or edge that is non-rotationally symmetric using existing manufacturing processes for lenses, such as soft contact lenses.

SUMMARY OF THE INVENTION

The mold for contact lens with non-rotationally symmetric rim or edge of the present invention provides a means for manufacturing lenses which overcome the disadvantages associated with the prior art as briefly described above by altering the planarity of the lens outer edge, the overall shape or symmetry of the lens, or both.

The mold for contact lens with non-rotationally symmetric rim or edge of the present invention provides a means for manufacturing lenses which overcome the disadvantages associated with the prior art as briefly described above by altering the planarity of the lens outer edge, the overall shape or symmetry of the lens, or both.

A mold for a front curve of an ophthalmic lens according to the present invention includes an inner region defining a front surface or curve of an ophthalmic lens and having a non-rotationally symmetric shape and an outer region having a rotationally symmetric shape. A continuous middle region is located between the inner region and the outer region. A first portion of the middle region is in contact with the inner region, defining a non-rotationally symmetric rim or edge of a front surface or curve of the ophthalmic lens. A second portion of the middle region is in contact with the outer region and is rotationally symmetrical.

The contact lenses may be manufactured utilizing existing technologies without any significant impact in cost over existing contact lenses. The contact lenses of the present invention may be utilized with any type of contact lens optics without additional cost and optimized to improve clinical comfort and/or physiology.

The improved fit contact lenses that may be manufactured by the mold of the present invention may be customized by populations, subpopulations and/or individuals. In addition, these contact lenses may be utilized with any type of contact lens optics or configurations without additional cost and optimized to improve clinical comfort and/or physiology.

BRIEF DESCRIPTION OF THE DRAWINGS

The foregoing and other features and advantages of the invention will be apparent from the following, more particular description of preferred embodiments of the invention, as illustrated in the accompanying drawings.

DETAILED DESCRIPTION OF THE PREFERRED EMBODIMENTS

A contact lens is defined by a front surface, a back surface or base curve and a rim or edge. For the purpose of the present invention, the shape of the rim or edge may be described by circularity, continuity, and planarity. A rim or edge is circular if the rim or edge projection onto a given plane is a circle, otherwise the rim or edge is non-circular. A rim or edge is continuous if the edge is a curve that may be classified as at least a class C1 curve. Continuous in this sense is defined as the shape being smooth and closed, which means that the slope, i.e. the first derivative of the curve is continuous, otherwise the rim or edge is discontinuous. A rim or edge is planar if it lies fully in a single plane, otherwise it is non-planar.

The present invention relates to a mold for a front curve of an ophthalmic lens, such as a contact lens, that enables manufacture of a lens with a non-rotationally symmetric rim or edge. In particular, the front curve mold according to the present invention allows for the use of an existing soft-molded manufacturing process for soft contact lenses. The mold for the front curve according to the present invention has a middle region or zone that maintains surface continuity between different mold regions, while providing for a lens having a non-rotationally symmetric rim or edge. In exemplary embodiments, the front curve mold provides for a contact lens having rim or edge that is at least one of non-circular, non-continuous, non-planar, or any combination thereof.

Figure 1:
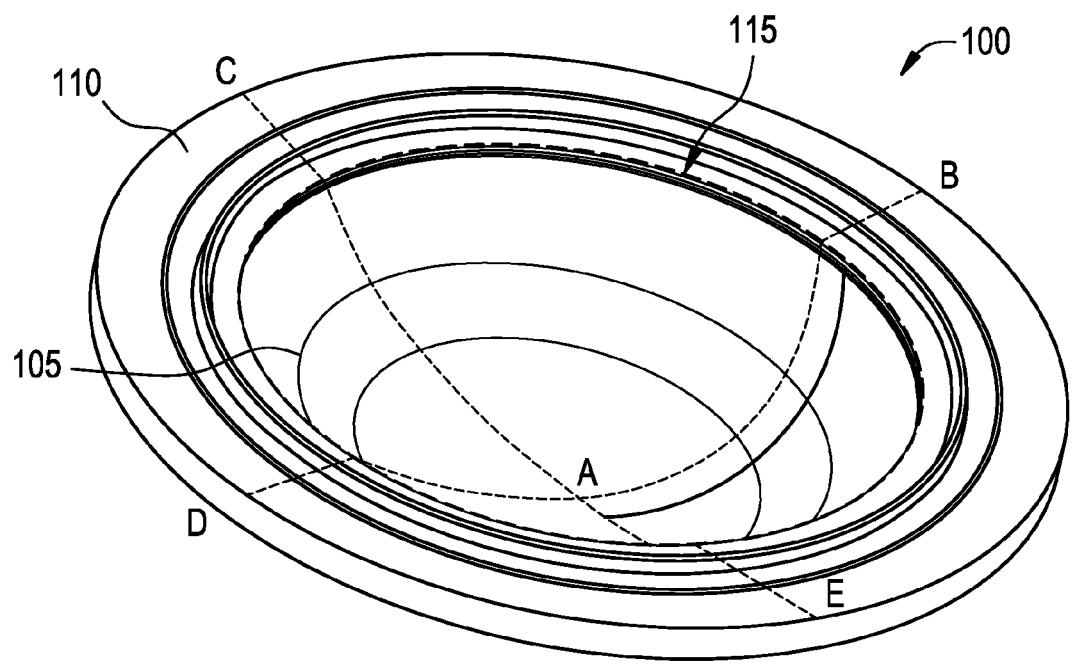
FIG. 1 is a perspective view of a known mold for a front curve of a contact lens. The mold results in a contact lens having a rotationally-symmetric rim or edge.
Figure 2:
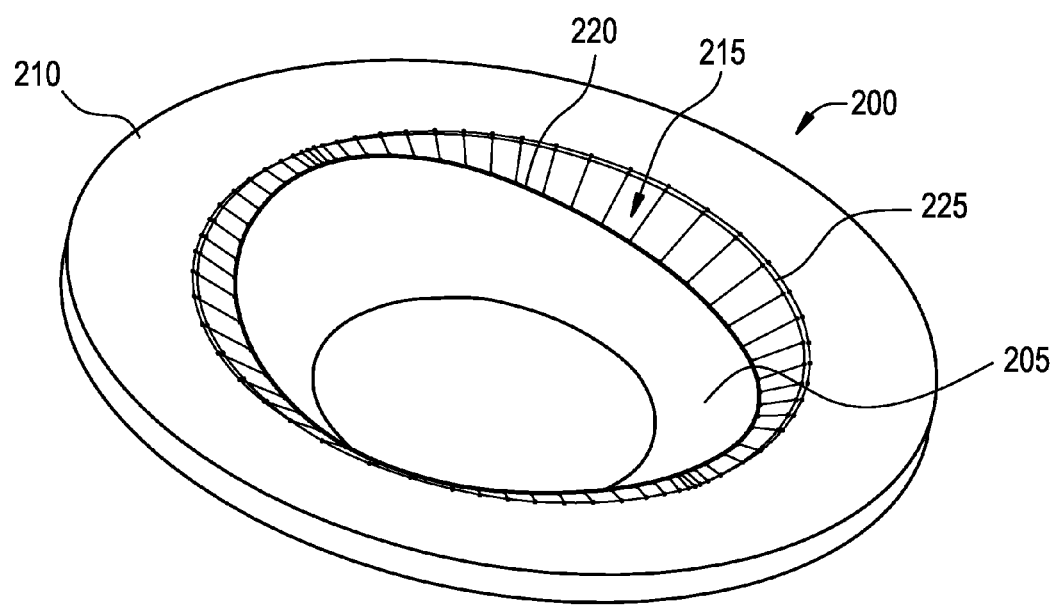
FIG. 2 is a perspective view of an exemplary mold for a front curve of a contact lens according to an embodiment of the present invention, showing an inner region, and outer region, and a middle region or zone. The mold results in a front curve of the lens having a non-rotationally symmetric rim or edge.

Referring now to FIG. 2, a front curve lens mold 200 according to the present invention comprises an inner region 205, which forms the front curve of the resulting lens, and an outer region 210, which does not form any part of the resulting lens. Inner region 205 has a non-rotationally symmetric shape and outer region 210 has a rotationally symmetric shape. Unlike the lens mold shown in FIG. 1, the inner region 205 and the outer region 210 do not intersect.

According to the present invention, a middle region or zone 215 is located between the inner region 205 and the outer region 210. In order to ensure surface continuity of the mold 1) a first portion of middle region 215 is in contact with the inner region 205, thereby defining a non-rotationally symmetrical rim or edge 220, and 2) a second portion of middle region or zone 215 is in contact with the outer region 210 and defines a rotationally symmetric rim or edge 225.

According to the present invention, the middle region or zone 215 does not have a known three-dimensional (3D) geometric form. Thus, the middle region 215 does not have a close form equation. Rather, the middle region 215 may be described as a two-dimensional (2D) variable surface with a geometry that varies by meridian. That is, the shape may be different in one or more cross-sections. Another way to define this middle region 215 is to define the two dimensional variable surface as the result of connecting the rotationally symmetric edge 225, which lies in a single plane, to the desired non-rotationally symmetrical lens edge geometry, for example, edge 220, which may be non circular, non planar and non continuous and connect these two edges with a line, a curve, a polynomial, or a combination of multiple curves that results in a variable surface that facilitates mold halves interaction, including mold insertion, molding and mold removal. Although cross-sections AB, AC, AD, and AE are illustrated in the figures, it will be understood that additional meridians may be used to describe the variable surface of the middle region. The shape of the portion of the middle region that contacts the inner region depends on the desired shape of a resulting lens rim or edge. In specific embodiments, the middle region may be defined by a line, a curve, a polynomial, or a combination of multiple curves in order to facilitate the molding process.

Figure 3A:
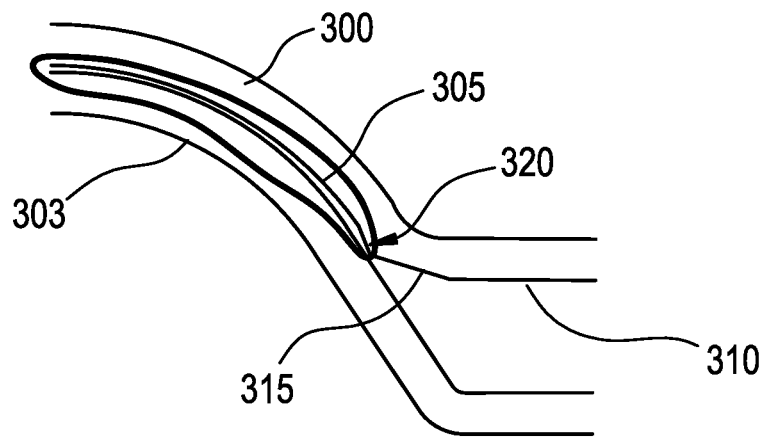
FIG. 3A is a cross-section side view of a mold for a front curve of a contact lens according to an embodiment of the present invention, which is affixed to a mold for a back curve of the contact lens. A middle region or zone of the front curve mold is shown. The resulting contact lens (circled) has a rim or edge that is circular, continuous, and non-planar.

Referring now to FIG. 3A, a side view of a portion of the front curve contact lens mold 300 according to the present invention and a back surface contact lens mold 303 is shown. Inner region 305 and outer region 310 of the front curve mold 300 are shown. The resulting contact lens located between the molds is circled. In this exemplary embodiment, middle region or zone 315 is a two-dimensional line. The contact lens has a rim or edge 320 that is circular, continuous, and non-planar.

Figure 3B:
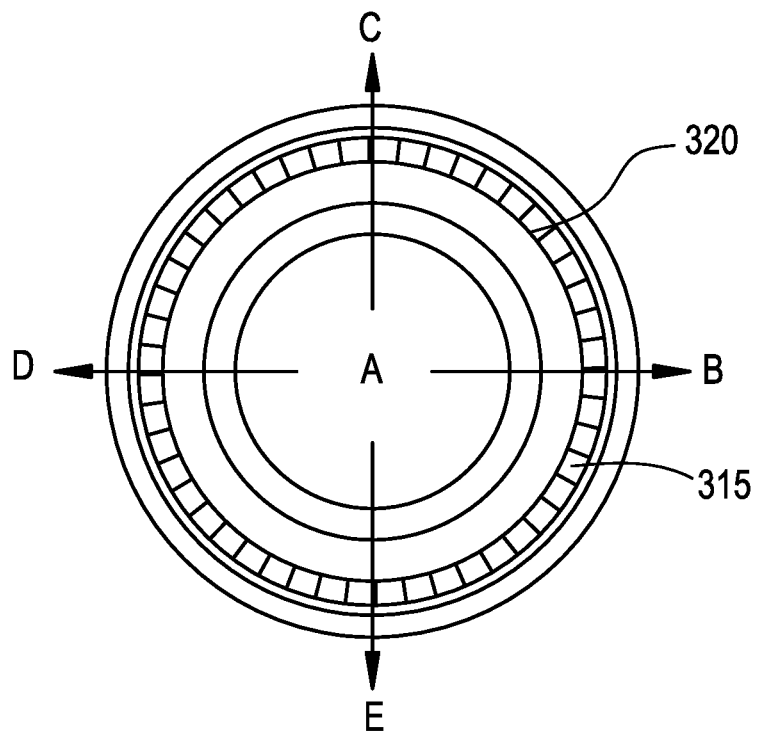
FIG. 3B is a top view of the molds of FIG. 3A with four cross sections AB, AC, AD, AE and illustrating the middle region or zone according to the present invention.

FIG. 3B is a top view of the molds 300, 303 shown in FIG. 3A, with middle region 315, lens rim 320, and cross sections AB, AC, AD, and AE illustrated.

Figure 3C:
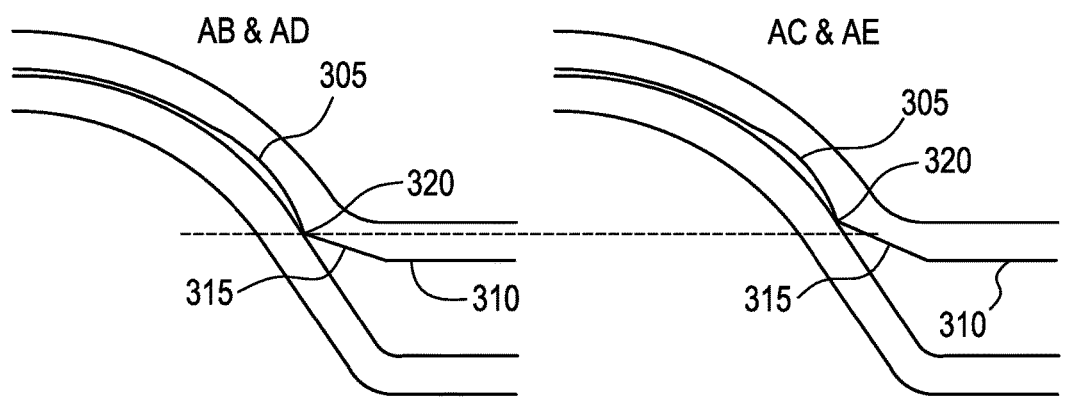
FIG. 3C is a side view comparison of cross sections AB and AD to cross sections AC and AE of the molds of FIGS. 3A-B. The rim or edge of the contact lens does not lie in the same plane as shown by the dotted line.

FIG. 3C shows side view comparisons of portions of cross sections AB & AD to cross sections AC & AE of the molds of FIGS. 3A-3B. The dotted line shows that the lens rim or edge 320 does not lie in a single plane.

Figure 4A:
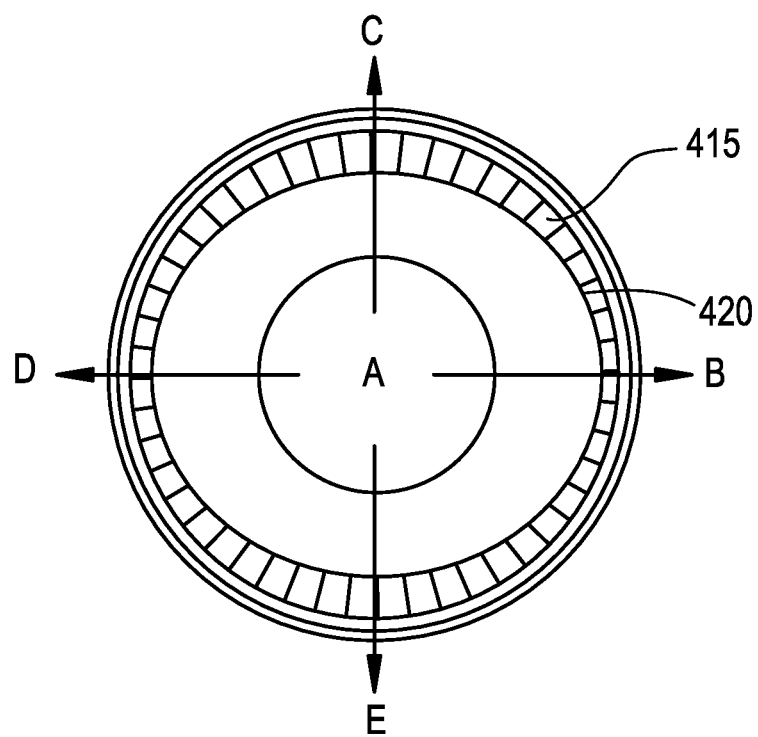
FIG. 4A is a top view of contact lens molds with the four cross sections AB, AC, AD, and AE and illustrating a middle region or zone according to the present invention. The resulting contact lens has a non-circular, continuous, and non-planar rim or edge.

Referring now to FIG. 4A, a top view of front and back molds for a contact lens having a non-circular, continuous, and non-planar rim or edge 420 is shown. A middle region 415 of the front curve mold according to the present invention is shown, along with cross-sections AB, AC, AD, and AE.

Figure 4B:
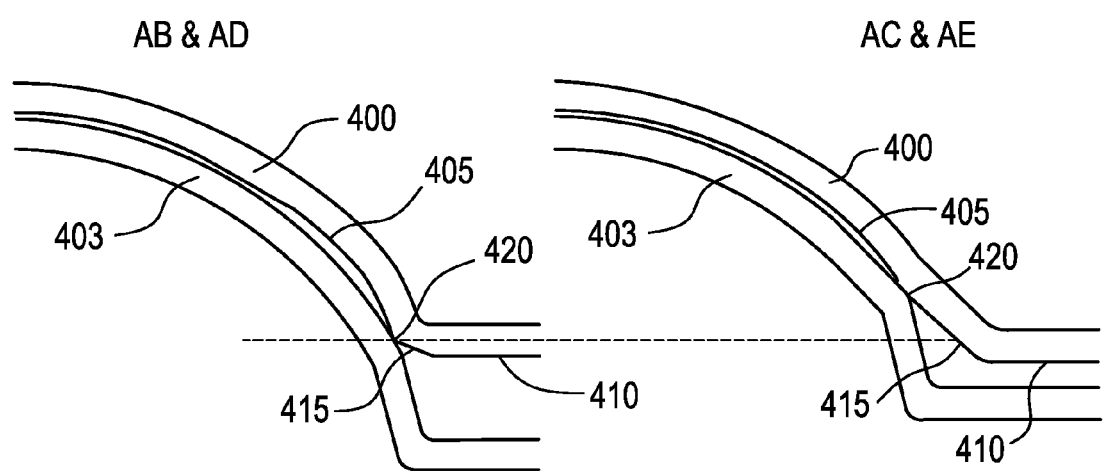
FIG. 4B is a side view comparison of cross-sections AB and AD to cross sections AC and AE of the molds of FIG. 4A. The rim or edge of the contact lens does not lie in the same plane as shown by the dotted line.

FIG. 4B shows side view comparisons of front curve contact lens mold 400 and back curve mold 403 for cross sections AB & AD to that of cross sections AC & AE of the molds of FIG. 4A. Inner region 405, outer region 410, and middle region or zone 415 of the front curve mold are shown. The dotted line shows that the lens rim or edge 420 of cross sections AB & AD is in a different plane than the lens rim or edge 420 of cross sections AC & AE due to the fact that the rim or edge is non-circular and non-planar.

Figure 5A:
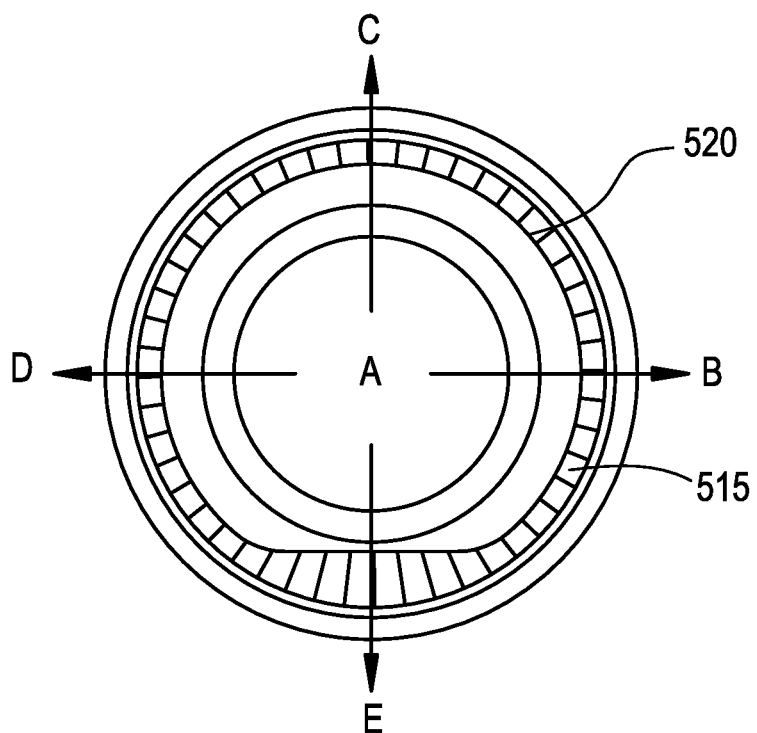
FIG. 5A is a top view of contact lens molds with the four cross sections AB, AC, AD, and AE and illustrating a middle region or zone according to the present invention. The resulting contact lens has a non-circular, non-continuous, and non-planar rim or edge.

Referring now to FIG. 5A, a top view of front and back molds for a contact lens having a non-circular, non-continuous, and non-planar rim or edge 520 is shown. A middle region 515 according to the present invention is shown, along with cross-sections AB, AC, AD, and AE.

Figure 5B:
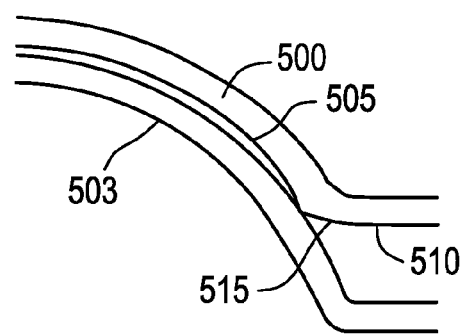
FIG. 5B is a side view of cross sections AB and AD of the contact lens molds of FIG. 5A.
Figure 5C:
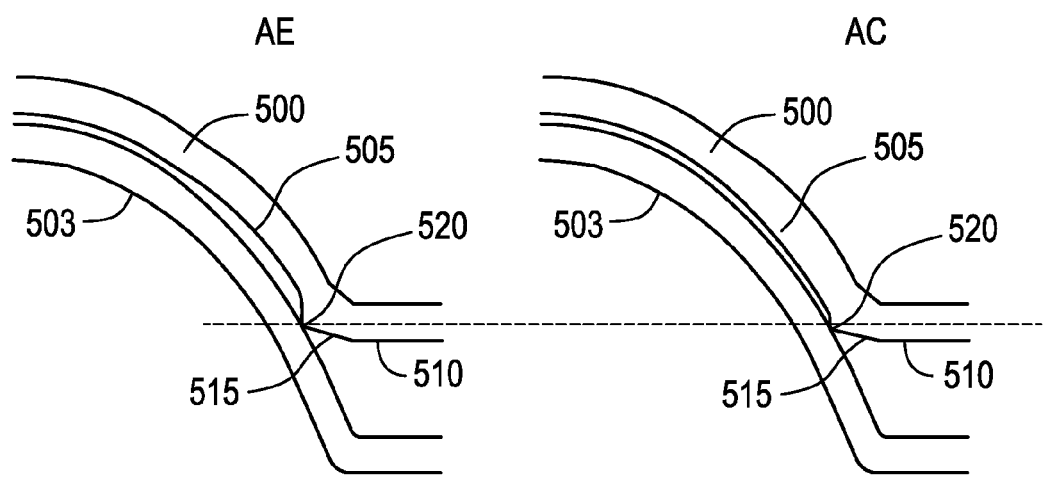
FIG. 5C is a side view comparison of cross section AE to cross section AC of the molds of FIG. 5A. The rim or edge of the contact lens does not lie in the same plane as shown by the dotted line.

FIG. 5B shows side view comparisons of front curve contact lens mold 500 and back curve contact lens mold 503 for cross sections AB & AD of FIG. 5A. Inner region 505, outer region 510, and middle region 515 are shown. FIG. 5C shows side view comparisons of cross section AE, to that of cross section AC both of FIG. 5A. The dotted line shows that the lens edge or rim 520 of cross section AC is in a different plane than the lens rim or edge 520 of cross section AE due to the fact that the rim or edge is non-circular, non-continuous, and non-planar.

Figure 6A:
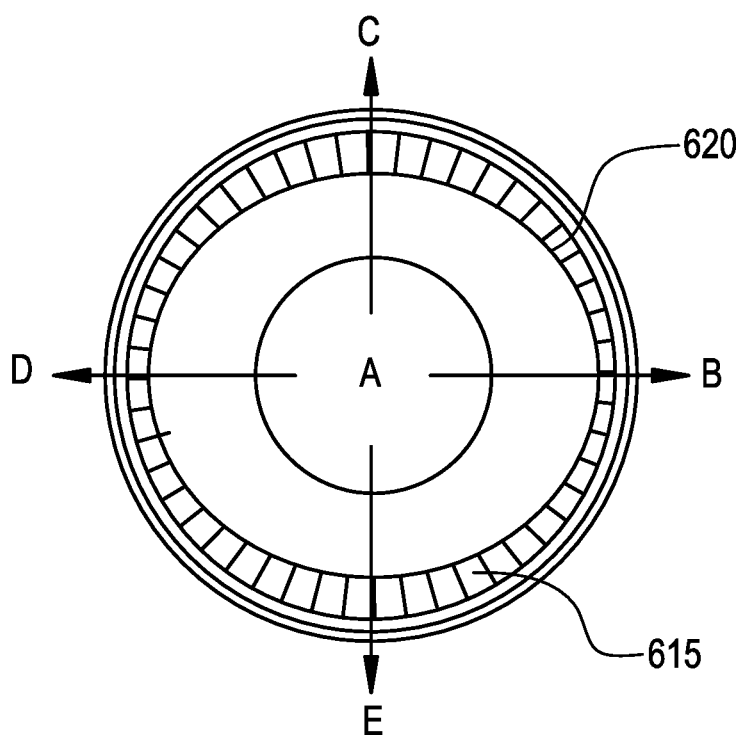
FIG. 6A is a top view of contact lens molds with the four cross sections AB, AC, AD, and AE and illustrating a middle region or zone according to the present invention. The resulting contact lens has a non-circular, continuous, and planar rim or edge.

Referring now to FIG. 6A, a top view of molds for a contact lens having a non-circular, continuous, planar rim or edge 620 is shown. A middle region 615 of a front curve mold according to the present invention is shown, along with cross-sections AB, AC, AD, and AE.

Figure 6B:
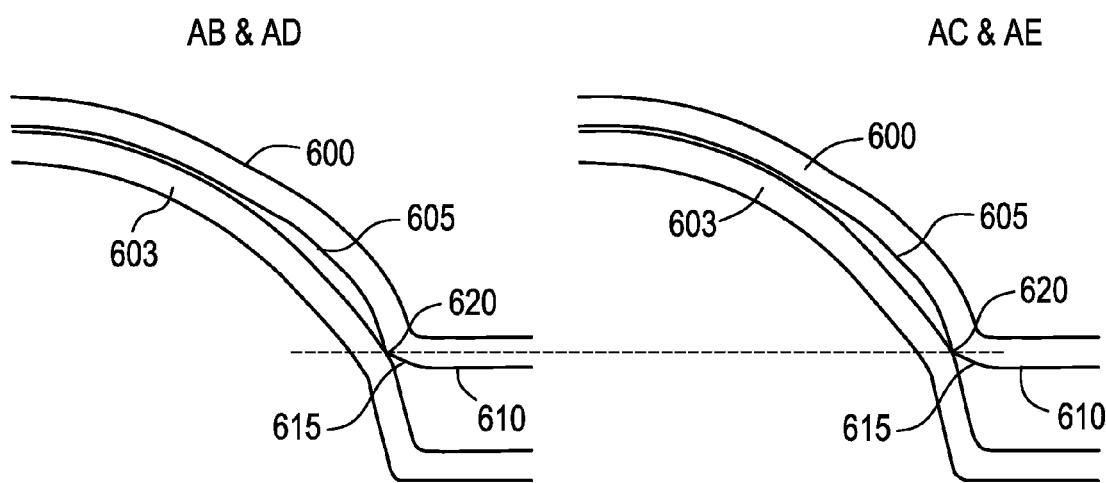
FIG. 6B is a side view comparison of cross sections AB and AD to cross sections AC and AE of the molds of FIG. 6A. The rim or edge of the contact lens lies in the same plane as shown by the dotted line.

FIG. 6B shows side view comparisons of front curve contact lens mold 600 and back curve contact lens mold 603 for cross sections AB & AD to cross sections AC & AE of the molds FIG. 6A. Inner region 605, outer region 610, and middle region or zone 615 are shown. The dotted line shows that the lens edge or rim 620 of cross sections AB & AD is in the same plane as the lens rim or edge 620 of cross sections AC & AE due to the fact that the rim or edge of the contact lens is planar.

Although shown and described is what is believed to be the most practical and preferred embodiments, it is apparent that departures from specific designs and methods described and shown will suggest themselves to those skilled in the art and may be used without departing from the spirit and scope of the invention. The present invention is not restricted to the particular constructions described and illustrated, but should be constructed to cohere with all modifications that may fall within the scope of the appended claims.

What is claimed is:

1. A mold pair for forming a contact lens therebetween, the contact lens having a front surface and an opposing back surface that meet at a lens edge, comprising:
    a back mold having a convex, rotationally symmetric surface;
    a front mold having an inner region, an outer region and a middle region positioned between and connecting said inner and outer regions, wherein the front mold further comprises
    an inner region having a concave portion bounded by a continuous, non- circular, non-planar, rotationally non-symmetric outer peripheral edge, wherein the concave portion and outer peripheral edge are sized and shaped to define said front surface and lens edge of said contact lens;
        an outer region having a rotationally symmetric shape and which does not influence a shape of said contact lens, said outer region lying in a single plane and having a continuous, circular, rotationally symmetric inner periphery, wherein said inner periphery of said outer region does not intersect with said outer peripheral edge of said inner region; and
        a middle region positioned between and connecting the outer peripheral edge of the inner region and the inner periphery of said outer region, the middle region comprising a continuous two-dimensional variable surface;
    wherein said front and back molds are adapted to be positioned relative to one another such that the outer peripheral edge of said inner region of said front mold is in constant contact with said convex surface of said back mold, and a space between said front and back molds defines a shape of said contact lens to be formed.

* * * * *